(12) United States Patent
Zhang et al.

(10) Patent No.: US 11,474,736 B2
(45) Date of Patent: Oct. 18, 2022

(54) NETWORK INTERFACE CONTROLLER WITH NON-VOLATILE RANDOM ACCESS MEMORY WRITE PACKET LOG

(71) Applicant: Intel Corporation, Santa Clara, CA (US)

(72) Inventors: Zhiyuan Zhang, Beijing (CN); Xiangbin Wu, Beijing (CN); Qianying Zhu, Beijing (CN); Xinxin Zhang, Beijing (CN); Yingzhe Shen, Beijing (CN); Haitao Ji, Beijing (CN)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 16/465,107

(22) PCT Filed: Dec. 29, 2016

(86) PCT No.: PCT/CN2016/112951
§ 371 (c)(1),
(2) Date: May 29, 2019

(87) PCT Pub. No.: WO2018/119843
PCT Pub. Date: Jul. 5, 2018

(65) Prior Publication Data
US 2019/0332314 A1    Oct. 31, 2019

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| 10,067,741 B1 * | 9/2018 | Khan ................... G06F 9/4856 |
| 2009/0010279 A1 * | 1/2009 | Tsang ..................... H04L 47/22 370/468 |

(Continued)

FOREIGN PATENT DOCUMENTS

| CN | 103631324 A | 3/2014 |
| CN | 103890738 A | 6/2014 |

(Continued)

OTHER PUBLICATIONS

Wang et al., Scalable Logging through Emerging Non-Volatile Memory, 2014, VLDB Endowment, 12 pages (Year: 2014).*

(Continued)

*Primary Examiner* — Gary W. Cygiel
(74) *Attorney, Agent, or Firm* — Schwabe, Williamson & Wyatt, P.C.

(57) ABSTRACT

Embodiments of the present disclosure provide devices, techniques, and configurations for network interface controllers (NICs) that log write packets received from a network in non-volatile random access memory (NVRAM). In one embodiment, a NIC includes a network interface to couple a host of the NIC to a network, a NVRAM, and a controller coupled with the network interface and the NVRAM, where the controller is to log write packets received at the network interface from the network in the NVRAM. Other embodiments may be described and/or claimed.

23 Claims, 4 Drawing Sheets

(56) References Cited

U.S. PATENT DOCUMENTS

2013/0042052 A1    2/2013  Colgrove et al.
2014/0122780 A1*  5/2014  Smith ................ G06F 12/0866
                                                                        711/103

FOREIGN PATENT DOCUMENTS

CN        103946816 A    7/2014
CN        105612491 A    5/2016

OTHER PUBLICATIONS

International Search Report and Written Opinion dated Sep. 28, 2017 for International Patent Application No. PCT/CN2016/112951, 12 pages.

* cited by examiner

NETWORK INTERFACE CONTROLLER WITH NON-VOLATILE RANDOM ACCESS MEMORY WRITE PACKET LOG

CROSS REFERENCE TO RELATED APPLICATIONS

The present application is a national phase entry under 35 U.S.C. § 371 of International Application No. PCT/CN2016/112951, filed Dec. 29, 2016, entitled "NETWORK INTERFACE CONTROLLER WITH NON-VOLATILE RANDOM ACCESS MEMORY WRITE PACKET LOG." The Specification of PCT/CN2016/112951 is hereby incorporated by reference.

FIELD

Embodiments of the present disclosure generally relate to the fields of computing and networking and, more particularly, to network interface controller devices, techniques, and configurations.

BACKGROUND

Distributed Object storage systems typically use a journal mechanism to ensure data consistency and improve write performance. Due to the journal mechanism, a write request will typically require at least two input/output (IO) requests to disk, one for the journaling and others for a final data disk write. This is referred to as a write-twice penalty, consumes processing time, and contributes to write latency. In legacy object storage servers, the average access latency due to the write-twice penalty may be approximately 200 microseconds per 4 kilobyte (KB) write.

BRIEF DESCRIPTION OF THE DRAWINGS

Embodiments of the network interface controller (NIC) with non-volatile random access memory (NVRAM) write packet log, as well as distributed object storage techniques of the present disclosure may overcome these limitations. The techniques will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
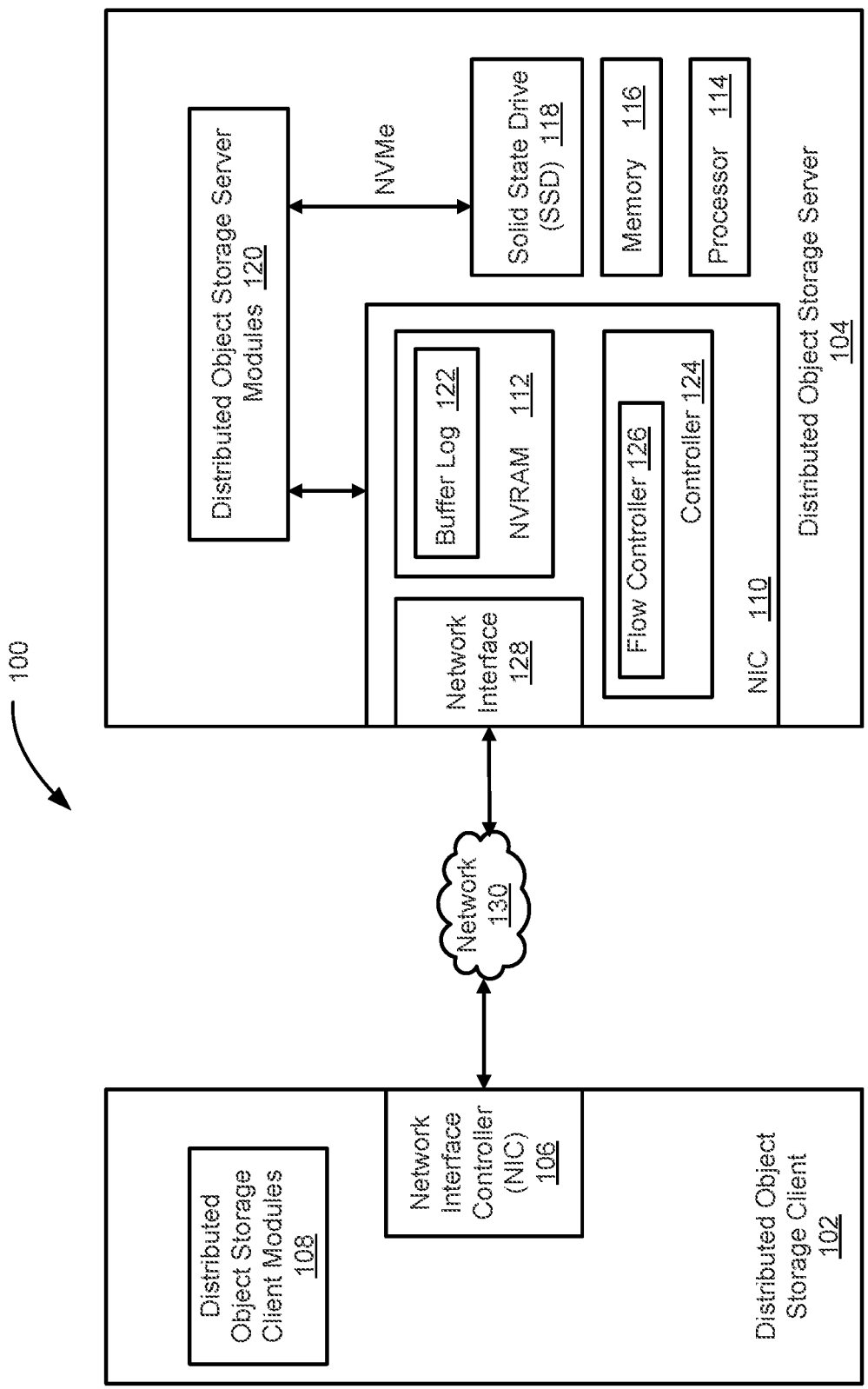
FIG. 1 is a block diagram of a distributed object storage networked computing environment including a NIC with a NVRAM write packet log, according to various embodiments.

Embodiments of the present disclosure describe devices, systems, and techniques for network interface controllers that log write packets received from a network in NVRAM. In various embodiments, a NIC may include a network interface to couple a host of the NIC to a network; a NVRAM; and a controller coupled with the network interface and the NVRAM, where the controller is to log write packets received at the network interface from the network in the NVRAM. In some embodiments, the NIC may log all incoming write packets in the NVRAM which may be used as a write-ahead log. In various embodiments, in the event of a system crash, the write packets stored in the log may be replayed and a write transaction may be restored. In some embodiments, write packet logging in NVRAM may reduce or remove the write-twice penalty and/or release a distributed object storage server from journal related work.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of a distributed object storage networked computing environment 100 including a NIC with a NVRAM write packet log, according to various embodiments. In some embodiments, the distributed object storage networked computing environment (hereinafter, simply "computing environment") 100 may include a distributed object storage client 102 and a distributed object storage server 104. In various embodiments, the distributed object storage client 102 may include a NIC 106 and distributed object storage client modules 108. In some embodiments, the distributed object storage client modules 108 may include distributed object storage client software (e.g., Ceph client software) that may run on one or more processors (not shown for clarity) of the distributed object storage client 102. In various embodiments, the distributed object storage client modules 108 may communicate with other devices in a networked distributed object storage system (e.g., distributed object storage server 104) using the NIC 106.

In various embodiments, the distributed object storage server 104 may include a NIC 110 having a NVRAM 112. In some embodiments, the distributed object storage server 104 may have one or more processors 114 and system memory 116. In various embodiments, the distributed object storage server 104 may include a solid state drive (SSD) 118 that may be accessed over a non-volatile memory express (NVMe) interface. In embodiments, the SSD 118 may be accessed over some other type of interface and/or some other type of non-volatile memory instead of or in addition to the SSD 118 may be included in the distributed object storage server 114. In some embodiments, the distributed object storage server 104 may include distributed object storage server modules 120. In various embodiments, the distributed object storage server modules 120 may include distributed object storage server software (e.g., Ceph server software that may include a Ceph object storage device (ceph-osd) daemon) that may run on the one or more processors 114.

In some embodiments, the NIC 110 may include a buffer log 122 in the NVRAM 112. In various embodiments, the buffer log 122 may be a circular buffer log. In some embodiments, the buffer log 122 may be a non-addressable buffer log isolated from access by the distributed object storage server modules 120 and/or the distributed object storage client modules 108. In various embodiments, the buffer log 122 may be isolated from access by a host (e.g., components of the distributed object storage server 104 other than the NIC 110) and/or isolated from access by a client device (e.g., distributed object storage client 102) of a distributed object storage system. In some embodiments, the buffer log 122 may be transparent to distributed object storage client software (e.g., distributed object storage client modules 108) and may be isolated from access by distributed object storage server software (e.g., distributed object storage server modules 120).

In various embodiments, the NIC 110 may include a controller 124 that may include a flow controller 126 to prevent logging overflow. In some embodiments, the flow controller 126 may use one or more of a transmission control protocol (TCP) window, Ethernet backpressure, or a remote direct memory access (RDMA) credit to prevent logging overflow. In various embodiments, the controller 124 may support RDMA access of a storage (e.g., memory 116) of a host (e.g., distributed object storage server 104). In some embodiments, the controller 124 may release buffer space of a buffer used for logging write packets (e.g., buffer log 122) in response to receipt of a tail pointer update. In various embodiments, the tail pointer update may be received from one or more of the distributed object storage server modules 120 and/or some other component of a distributed object storage system. In some embodiments, the controller 124 may include a processor and/or memory, both not shown for clarity.

In some embodiments, the NIC 110 may include a network interface 128. In various embodiments, the controller 124 may be coupled with the network interface 128 and the NVRAM 112. In some embodiments, the distributed object storage server 104 may communicate with the distributed object storage client 102 over a network 130. In various embodiments, the distributed object storage server 104 may be referred to as a host of the NIC 110.

In various embodiments, the controller 124 may direct a replay of the buffer log 122 in response to recovery from a system crash or power failure of a host (e.g., distributed object storage server 104). In some embodiments, the processor 114 and/or one or more of the distributed object storage server modules 120 may request a replay of the buffer log 122 in response to recovery from a system crash or power failure (e.g., when the distributed object storage server 104 reboots after a loss of power or other failure while processing transactions) and the controller 124 may direct the replay of the buffer log 122 in response to the request. In various embodiments, the distributed object storage server modules 120 may check the replayed packets and/or transactions in the buffer log 122 to ensure the data are in a consistent state and nothing was lost during the previous failure before returning to normal service operation.

In various embodiments, NVRAM 112 may include various types of non-volatile memory that may include, but is not limited to, types of memory such as 3-D cross-point memory that may be byte or block addressable. These byte or block addressable non-volatile types of memory may include, but are not limited to, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) that incorporates memristor technology, spin transfer torque MRAM (STT-MRAM), or a combination of any of the above, or other non-volatile memory types.

Figure 2:
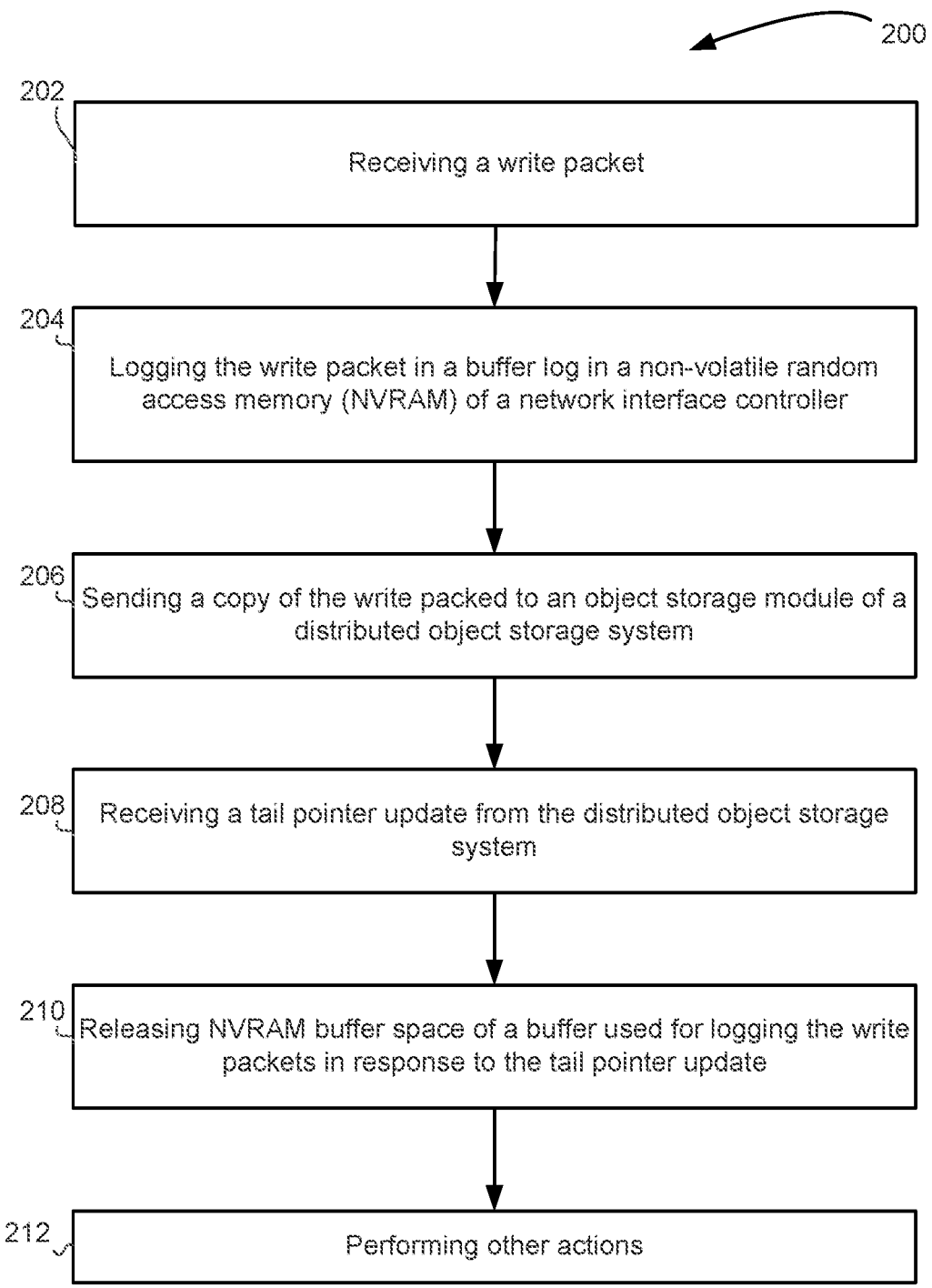
FIG. 2 is a flow diagram illustrating a method of distributed object data storage, according to various embodiments.

FIG. 2 is a flow diagram illustrating a method 200 of distributed object data storage, according to various embodiments. In embodiments, some or all of the method 200 may be practiced by components of the distributed object storage server 104, described with respect to FIG. 1. In some embodiments, portions of the method 200 may be practiced by components of the distributed object storage client 102, described with respect to FIG. 1.

In some embodiments, the method 200 may include receiving, by a NIC (e.g., NIC 110), a write packet (e.g., an object store primitive PUT (key, value) request). In various embodiments, the write packet may be received from a distributed object storage client (e.g., distributed object storage client 102). In various embodiments, at a block 204, the method 200 may include logging the write packet in a buffer log (e.g., buffer log 122) in a NVRAM (e.g., NVRAM 112) of a distributed object storage system (e.g., distributed object storage server 104). In some embodiments, the buffer log may be a non-addressable buffer log that may be a circular. In various embodiments, logging the write packet may include storing the write packet in the buffer log at a location specified by a header pointer of an NVRAM circular buffer.

In some embodiments, at a block 206, the method 200) may include sending a copy of the write packet to an object storage module of a distributed object storage system (e.g., an object storage module in the distributed object storage server modules 120). In various embodiments, sending a copy of the write packet to an object storage module at the block 206 may be performed simultaneously with logging the write packet at the block 206. In some embodiments, the distributed object storage server (e.g., one or more of the distributed object storage server modules 120) may process the write packet, send a response to the client that sent the write packet (e.g., distributed object storage client 102), and schedule a disk write of the write packet (e.g., in SSD 118). In some embodiments, the distributed object storage server may respond to a write request (e.g., receipt of the write packet) before any input/output (IO) device access (e.g., a write to SSD 118) is performed. In some embodiments, the distributed object storage server may postpone disk access until the circular buffer log (e.g., buffer log 122) is full. In various embodiments, one or more distributed object storage server modules may update a tail pointer after the scheduled disk write is finished.

In various embodiments, at a block 208, the method 200 may include receiving a tail pointer update (e.g., at the NIC 110) from the distributed object storage system (e.g., distributed object storage server modules 120). In some embodiments, at a block 210, the method 200 may include releasing NVRAM buffer space of a buffer (e.g., buffer log 122) used for logging the write packets in response to the tail pointer update. In some embodiments, the method 200 may include performing other actions at a block 212.

Figure 3:
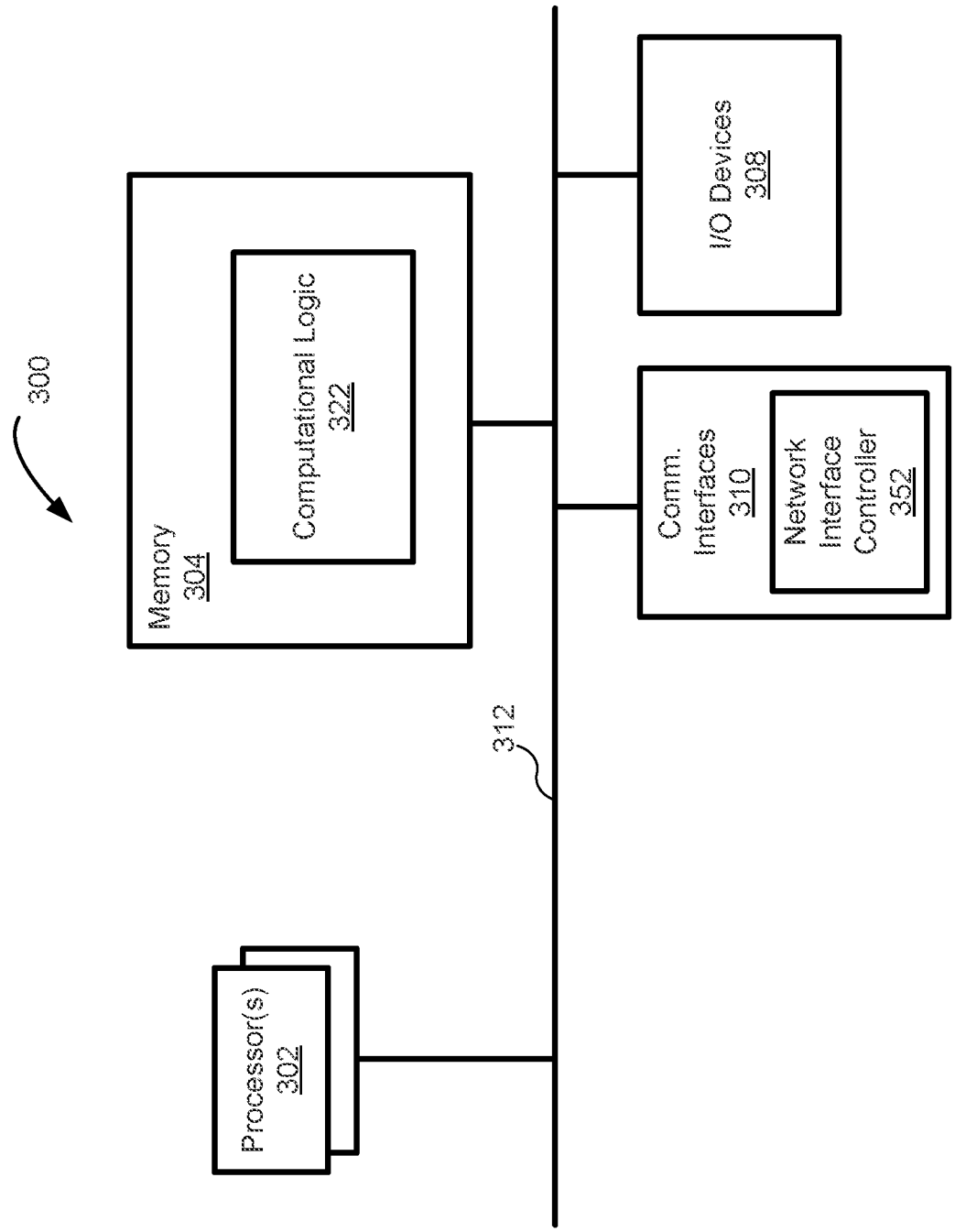
FIG. 3 schematically illustrates an example computer device to store distributed object data using a NIC with a NVRAM write packet log, according to various embodiments.

FIG. 3 illustrates an example computer device 300 that may include components corresponding to and/or implementing various components and methods of FIGS. 1-2, such as distributed object storage server 104 with NIC 110, described with respect to FIG. 1, in accordance with various embodiments. In various embodiments, the computer device 300 may be or include a NIC configured in similar fashion to the NIC 110 of FIG. 1. As shown, computer device 300 may include one or more processors 302, each having one or more processor cores, and system memory 304. The processor 302 may include any type of processors, single or multi-core microprocessors, and the like. The processor 302 may be implemented as an integrated circuit. In general, system memory 304 may be temporal and/or persistent storage of any type, including, but not limited to, volatile and non-volatile memory, optical, magnetic, and/or solid state storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computer device 300 may further include input/output devices 308 (such as a display (e.g., a touchscreen display), keyboard, cursor control, remote control, gaming controller, image capture device, and so forth) and communication interfaces 310 (such as modems, infrared receivers, radio receivers (e.g., Bluetooth), and so forth). In some embodiments, the communications interfaces 310 may also include a NIC 352. In various embodiments, the NIC 352 may be configured similarly to NIC 110, and/or the processor 302 may be configured similarly to the processor 114 and/or a processor within the NIC 110 described with respect to FIG. 1. In some embodiments, the NIC 352 may be coupled with other components of the computer device 300 and/or may not be included within the communications interfaces 310.

The communication interfaces 310 may include communication chips (not shown) that may be configured to operate the computer device 300 in accordance with a Global System for Mobile Communication (GSM), General Packet Radio Service (GPRS). Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 310 may operate in accordance with other wireless protocols in other embodiments.

The above-described computer device 300 elements may be coupled to each other via system bus 312, which may represent one or more buses. In the case of multiple buses, they may be bridged by one or more bus bridges (not shown). Each of these elements may perform its conventional functions known in the art. In particular, system memory 304 may be employed to store a working copy and a permanent copy of the programming instructions, such as drivers, for the operation of various components of computer device 300, including but not limited to operation of the distributed object storage server 102 of FIG. 1, the NIC 110 of FIG. 1, the processor 114 of FIG. 1, other components of FIG. 1, an operating system of computer device 300, and/or one or more applications, collectively referred to as computational logic 322. The various elements may be implemented by assembler instructions supported by processor(s) 302 or high-level languages that may be compiled into such instructions.

The permanent copy of the programming instructions may be placed into system memory 304 in the factory or in the field through, for example, a distribution medium (not shown), or through communication interface 310 (from a distribution server (not shown)). That is, one or more distribution media having an implementation of the agent program may be employed to distribute the agent and to program various computing devices. The number, capability, and/or capacity of the elements 308, 310, 312 may vary. Their constitutions are otherwise known, and accordingly will not be further described.

For some embodiments, at least one of processors 302 may be packaged together with memory having all or portions of computational logic 322 configured to facilitate aspects of embodiments described herein to form a System in Package (SiP) or a System on Chip (SoC).

The computer device 300 may include, be, or otherwise be associated with an electronic device that may include components and/or implement methods described with respect to FIGS. 1-2, such as the distributed object storage server 104, NIC 110, the processor 114, other components of FIG. 1, and/or the method 200 as described above. In some embodiments, one or more components such as processor 302, memory 304, and/or computational logic 322 may be included as a part of the distributed object storage server 104 and/or the distributed object storage client 102.

Figure 4:
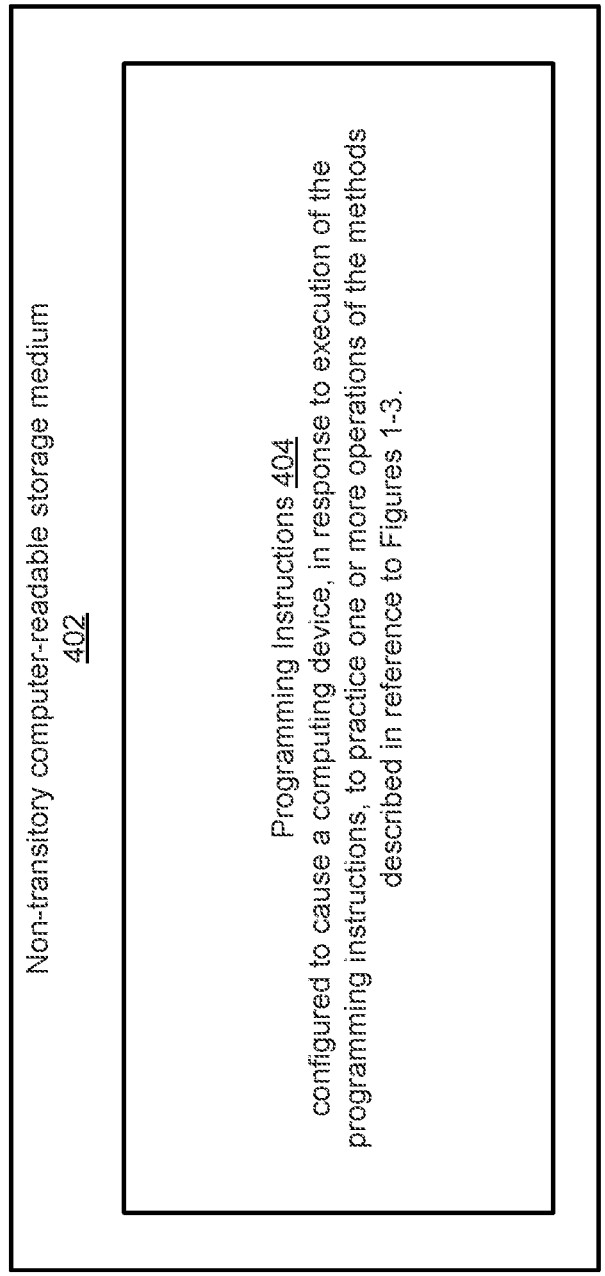
FIG. 4 illustrates an example storage medium with instructions configured to enable an apparatus to practice various aspects of the present disclosure, in accordance with various embodiments.

FIG. 4 illustrates example computer-readable storage medium 402 having instructions configured to practice all or selected ones of the operations associated with the computer device 300, earlier described with respect to FIG. 3; the distributed object storage sever 104, the NIC 110, the processor 114, the distributed object storage client 102, and/or the other components of FIG. 1; and/or the method 200 of FIG. 2, in accordance with various embodiments. As illustrated, computer-readable storage medium 402 may include a number of programming instructions 404. The storage medium 402 may represent a broad range of non-transitory persistent storage medium known in the art, including but not limited to flash memory, dynamic random access memory, static random access memory, an optical disk, a magnetic disk, etc. Programming instructions 404 may be configured to enable a device, e.g., computer device 300, distributed object storage server 104, NIC 110, and/or processor 114 in response to execution of the programming instructions 404, to perform, e.g., but not limited to, various operations described for the NIC 110, and/or other components of the distributed object storage server 102 shown in FIG. 1, the computer device 300 of FIG. 3, or operations shown in process 200 of FIG. 2. In alternate embodiments, programming instructions 404 may be disposed on multiple computer-readable storage media 402. In alternate embodiment, storage medium 402 may be transitory, e.g., signals encoded with programming instructions 404.

Referring back to FIG. 3, for an embodiment, at least one of processors 302 may be packaged together with memory having all or portions of computational logic 322 configured to practice aspects described for the NIC 110, the processor 114 and/or other components of the distributed object storage server 104 shown in FIG. 1, or operations shown in method 200 of FIG. 2. For an embodiment, at least one of processors 302 may be packaged together with memory having all or portions of computational logic 322 configured to practice aspects described for the NIC 110, the processor 114 and/or other components of the distributed object storage server 104 shown in FIG. 1, or operations shown in method 200 of FIG. 2 to form a System in Package (SiP). For an embodiment, at least one of processors 302 may be integrated on the same die with memory having all or portions of computational logic 322 configured to practice aspects described for the NIC 110, the processor 114 and/or other components of the distributed object storage server 104 shown in FIG. 1, or operations shown in process 200 of FIG. 2. For an embodiment, at least one of processors 302 may be packaged together with memory having all or portions of computational logic 322 configured to practice aspects of the NIC 110, the processor 114 and/or other components of the distributed object storage server 104 shown in FIG. 1, or operations shown in process 200 of FIG. 2 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include a network interface controller (NIC) comprising: a network interface to couple a host of the NIC to a network; a non-volatile random access memory (NVRAM); and a controller coupled with the network interface and the NVRAM, wherein the controller is to log write packets received at the network interface from the network in the NVRAM.

Example 2 may include the subject matter of Example 1, wherein the controller is to log the write packets in a non-addressable buffer log.

Example 3 may include the subject matter of Example 2, wherein the non-addressable buffer log is a circular log.

Example 4 may include the subject matter of any one of Examples 2-3, wherein the non-addressable buffer log is isolated from access by the host.

Example 5 may include the subject matter of any one of Examples 1-4, wherein the controller is to further direct a replay of the buffer log in response to recovery from a system crash or power failure of the host.

Example 6 may include the subject matter of any one of Examples 1-5, wherein the controller is to further support remote direct memory access (RDMA) of a storage of the host.

Example 7 may include the subject matter of any one of Examples 1-6, wherein the controller includes a flow controller to prevent logging overflow.

Example 8 may include the subject matter of Example 7, wherein the flow controller is to use one or more of a transmission control protocol (TCP) window. Ethernet backpressure, or a remote direct memory access (RDMA) credit to prevent logging overflow.

Example 9 may include the subject matter of Example 7, wherein the flow controller is to perform one or more of a packet drop or a negative acknowledgment (Nak) of a packet in response to reception of a write packet after a buffer used for logging the write packets is full.

Example 10 may include the subject matter of any one of Examples 1-9, wherein the controller is to release buffer space of a buffer used for logging the write packets, in response to receipt of a tail pointer update, wherein the host is part of a distributed object storage system.

Example 11 may include the subject matter of any one of Examples 1-10, wherein the NVRAM comprises 3-dimensional cross-point memory, memory that uses chalcogenide phase change material, multi-threshold level NAND flash memory, NOR flash memory, single or multi-level phase change memory (PCM), resistive memory, ovonic memory, nanowire memory, ferroelectric transistor random access memory (FeTRAM), magnetoresistive random access memory (MRAM) memory that incorporates memristor technology, or spin transfer torque MRAM (STT-MRAM).

Example 12 may include at least one computer-readable medium comprising instructions stored thereon that, in response to execution of the instructions by one or more processors of a network interface device, cause the network interface device to: log a write packet received at a network interface of the network interface device in a non-volatile random access memory (NVRAM) buffer log: and send a copy of the write packet to an object storage module of a distributed object storage system that hosts the network interface device.

Example 13 may include the subject matter of Example 12, wherein the instructions are to cause the network interface device to log the write packet in the NVRAM buffer log and send the copy of the write packet to the object storage module simultaneously.

Example 14 may include the subject matter of any one of Examples 12-13, wherein the buffer log is a circular buffer log.

Example 15 may include the subject matter of any one of Examples 12-14, wherein the instructions are further to cause the network interface device to release NVRAM buffer space of a buffer used for logging the write packets, in response to receipt of a tail pointer update from the distributed object storage system.

Example 16 may include the subject matter of any one of Examples 12-15, wherein the buffer log is isolated from access by a host.

Example 17 may include the subject matter of any one of Examples 12-16, wherein the buffer log is not addressable.

Example 18 may include the subject matter of any one of Examples 12-17, wherein the instructions are further to cause the network interface device to prevent logging overflow.

Example 19 may include the subject matter of Example 18, wherein the instructions are to cause the network interface device to prevent logging overflow using one or more of a transmission control protocol (TCP) window, Ethernet backpressure, or a remote direct memory access (RDMA) credit.

Example 20 may include the subject matter of Example 18, wherein the instructions are to cause the network interface device to perform one or more of a packet drop or a negative acknowledgment (Nak) of a packet in response to reception of a write packet after a buffer used for logging the write packets is full.

Example 21 may include the subject matter of any one of Examples 12-20, wherein the instructions are further to cause the network interface device to replay the buffer log in response to recovery from a system crash or power failure.

Example 22 may include the subject matter of any one of Examples 12-21, wherein the NVRAM comprises 3-dimensional cross-point memory, memory that uses chalcogenide phase change material, multi-threshold level NAND flash memory, NOR flash memory, single or multi-level phase change memory (PCM), resistive memory, ovonic memory, nanowire memory, ferroelectric transistor random access memory (FeTRAM), magnetoresistive random access memory (MRAM) memory that incorporates memristor technology, or spin transfer torque MRAM (STT-MRAM).

Example 23 may include a method of distributed object data storage comprising: receiving, by a network interface controller (NIC), a write packet; and logging, by the NIC, the write packet in a non-addressable buffer log in a non-volatile random access memory (NVRAM) of the NIC.

Example 24 may include the subject matter of Example 23, further comprising: sending, by the NIC, a copy of the write packet to an object storage module of a distributed object storage system that hosts the NIC.

Example 25 may include the subject matter of Example 24, wherein the copy of the write packet is sent to the object storage module simultaneously with logging the write packet in the NVRAM.

Example 26 may include the subject matter of any one of Examples 23-25, wherein logging the write packet includes logging the write packet in a circular log buffer.

Example 27 may include the subject matter of any one of Examples 23-26, further comprising: receiving, by the NIC, a tail pointer update from the distributed object storage system; and releasing, by the NIC, NVRAM buffer space of a buffer used for logging the write packets, in response to the tail pointer update.

Example 28 may include the subject matter of any one of Examples 23-27, wherein the NVRAM comprises 3-dimensional cross-point memory, memory that uses chalcogenide phase change material, multi-threshold level NAND flash memory, NOR flash memory, single or multi-level phase change memory (PCM), resistive memory, ovonic memory, nanowire memory, ferroelectric transistor random access memory (FeTRAM), magnetoresistive random access memory (MRAM) memory that incorporates memristor technology, or spin transfer torque MRAM (STT-MRAM).

Example 29 may include an electronic device comprising: one or more processors; a solid state drive coupled with the one or more processors; and a network interface controller (NIC) coupled with the one or more processors, including: a network interface to couple a host of the NIC to a network, a non-volatile random access memory (NVRAM); and a controller coupled with the network interface and the NVRAM, wherein the NIC is to log write packets received at the network interface from the network in a non-addressable buffer log in the NVRAM.

Example 30 may include the subject matter of Example 29, wherein the non-addressable buffer log is a circular log.

Example 31 may include the subject matter of any one of Examples 29-30, wherein the non-addressable buffer log is isolated from access by the host.

Example 32 may include the subject matter of any one of Examples 29-31, wherein the NIC is to direct a replay of the non-addressable log in response to recovery from a system crash or power failure.

Example 33 may include the subject matter of any one of Examples 29-32, wherein the NIC is further to support remote direct memory access (RDMA) of a storage of the host.

Example 34 may include the subject matter of any one of Examples 29-33, wherein the controller includes a flow controller to prevent logging overflow.

Example 35 may include the subject matter of Example 34, wherein the flow controller is to use one or more of a transmission control protocol (TCP) window, Ethernet backpressure, or a remote direct memory access (RDMA) credit to prevent logging overflow.

Example 36 may include the subject matter of Example 34, wherein the flow controller is to perform one or more of a packet drop or a negative acknowledgment (Nak) of a packet in response to reception of a write packet after a buffer used for logging the write packets is full.

Example 37 may include the subject matter of any one of Examples 29-36, wherein the NIC is to release buffer space of a buffer used for logging the write packets, in response to receipt of a tail pointer update, wherein the host is part of a distributed object storage system.

Example 38 may include the subject matter of any one of Examples 29-37, wherein the NVRAM comprises 3-dimensional cross-point memory, memory that uses chalcogenide phase change material, multi-threshold level NAND flash memory, NOR flash memory, single or multi-level phase change memory (PCM), resistive memory, ovonic memory, nanowire memory, ferroelectric transistor random access memory (FeTRAM), magnetoresistive random access memory (MRAM) memory that incorporates memristor technology, or spin transfer torque MRAM (STT-MRAM).

Example 39 may include a network interface controller (NIC) comprising: means for receiving a write packet; and means for logging the write packet in a non-addressable buffer log in a non-volatile random access memory (NVRAM) of the NIC.

Example 40 may include the subject matter of Example 39, further comprising: means for sending a copy of the write packet to an object storage module of a distributed object storage system that hosts the NIC.

Example 41 may include the subject matter of Example 40, wherein the copy of the write packet is sent to the object storage module simultaneously with logging the write packet in the NVRAM.

Example 42 may include the subject matter of any one of Examples 40-41, wherein logging the write packet includes logging the write packet in a circular log buffer.

Example 43 may include the subject matter of any one of Examples 40-42, further comprising: means for receiving a tail pointer update from the distributed object storage system; and for releasing NVRAM buffer space of a buffer used for logging the write packets, in response to the tail pointer update.

Example 44 may include the subject matter of any one of Examples 39-43, wherein the NVRAM comprises 3-dimensional cross-point memory, memory that uses chalcogenide phase change material, multi-threshold level NAND flash memory, NOR flash memory, single or multi-level phase change memory (PCM), resistive memory, ovonic memory, nanowire memory, ferroelectric transistor random access memory (FeTRAM), magnetoresistive random access memory (MRAM) memory that incorporates memristor technology, or spin transfer torque MRAM (STT-MRAM).

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A network interface controller (NIC) comprising:
a network interface to couple a host of the NIC to a network, wherein the host includes at least one object storage module;
a non-volatile random access memory (NVRAM) having a buffer log; and
a controller coupled with the network interface and the NVRAM, wherein the controller is to:
log one or more write packets received at the network interface from a distributed object storage client via the network into the buffer log of the NVRAM;
simultaneously with the logging of the one or more write packets into the buffer log of the NVRAM, send a copy of the one or more write packets to the at least one object storage module; and
postpone access to a solid state drive (SSD) coupled with the at least one object storage module until the buffer log of the NVRAM is full.

2. The NIC of claim 1, wherein the buffer log is a non-addressable buffer log.

3. The NIC of claim 2, wherein the non-addressable buffer log is isolated from access by the at least one object storage module.

4. The NIC of claim 2, wherein the non-addressable buffer log is isolated from access by the host.

5. The NIC of claim 1, wherein the controller is to further direct a replay of the buffer log in response to recovery from a system crash or power failure of the host.

6. The NIC of claim 1, wherein the controller is to further support remote direct memory access (RDMA) of a storage of the host.

7. The NIC of claim 1, wherein the controller includes a flow controller to prevent logging overflow.

8. The NIC of claim 7, wherein the flow controller is to use one or more of a transmission control protocol (TCP) window, Ethernet backpressure, or a remote direct memory access (RDMA) credit to prevent logging overflow.

9. The NIC of claim 7, wherein the flow controller is to perform one or more of a packet drop or a negative acknowledgment (Nak) of a packet in response to reception of a write packet after a buffer used for logging the write packets is full.

10. The NIC of claim 1, wherein the controller is to release buffer space of the buffer log occupied by the one or write packets in the buffer log of the NVRAM, in response to receipt of a tail pointer update, wherein the host is part of a distributed object storage system.

11. The NIC of claim 1, wherein the NVRAM comprises 3-dimensional cross-point memory, memory that uses chalcogenide phase change material, multi-threshold level NAND flash memory, NOR flash memory, single or multi-level phase change memory (PCM), resistive memory, ovonic memory, nanowire memory, ferroelectric transistor random access memory (FeTRAM), magnetoresistive random access memory (MRAM) memory that incorporates memristor technology, or spin transfer torque MRAM (STT-MRAM).

12. At least one non-transitory computer-readable medium comprising instructions stored thereon that, in response to execution of the instructions by one or more processors of a network interface device, cause the network interface device to:
log a write packet received at a network interface of the network interface device from a distributed object storage client via the network into a non-volatile random access memory (NVRAM) buffer log;
simultaneously with the logging of the write packet into the buffer log of the NVRAM, send a copy of the write packet to an object storage module of a distributed object storage system that hosts the network interface device; and
postpone access to a solid state drive (SSD) coupled with the at least one object storage module until the buffer log of the NVRAM is full.

13. The at least one non-transitory computer-readable medium of claim 12, wherein the buffer log is a circular buffer log.

14. The at least one non-transitory computer-readable medium of claim 13, wherein the instructions are further to cause the network interface device to release NVRAM buffer space of the buffer log occupied by the write packet in the buffer log of the NVRAM, in response to receipt of a tail pointer update from the distributed object storage system.

15. The at least one non-transitory computer-readable medium of claim 12, wherein the buffer log is isolated from access by a host.

16. The at least one non-transitory computer-readable medium of claim 12, wherein the buffer log is not addressable.

17. The at least one non-transitory computer-readable medium of claim 12, wherein the instructions are further to cause the network interface device to prevent logging overflow.

18. The at least one non-transitory computer-readable medium of claim 17, wherein the instructions are to cause the network interface device to prevent logging overflow using one or more of a transmission control protocol (TCP) window, Ethernet backpressure, or a remote direct memory access (RDMA) credit.

19. The at least one non-transitory computer-readable medium of claim 17, wherein the instructions are to cause the network interface device to perform one or more of a packet drop or a negative acknowledgment (Nak) of a packet in response to reception of a write packet after a buffer used for logging the write packets is full.

20. The at least one non-transitory computer-readable medium of claim 12, wherein the instructions are further to cause the network interface device to replay the buffer log in response to recovery from a system crash or power failure.

21. A method of distributed object data storage comprising:
receiving, by a network interface controller (NIC) of a host that includes at least one object storage module, a write packet from a distributed object storage client via the network;
logging, by the NIC, the write packet in a non-addressable buffer log in a non-volatile random access memory (NVRAM) of the NIC;
simultaneously with the logging of the write packet into the buffer log of the NVRAM, sending, by the NIC, a copy of the write packet to the at least one object storage module; and
postponing, by the NIC, access to a solid state drive (SSD) coupled with the at least one object storage module until the buffer log of the NVRAM is full.

22. An electronic device comprising:
one or more processors;
a solid state drive coupled with the one or more processors;
at least one object storage module coupled with the solid state drive; and
a network interface controller (NIC) coupled with the one or more processors, including:
a network interface to couple a host of the NIC to a network;
a non-volatile random access memory (NVRAM); and
a controller coupled with the network interface and the NVRAM, wherein the NIC is to:
log one or more write packets received at the network interface from a distributed object storage client via the network into a non-addressable buffer log in the NVRAM; and
simultaneously with the logging of the one or more write packets into the buffer log of the NVRAM, send a copy of the one or more write packets to the at least one object storage module; and
postpone access to a solid state drive (SSD) coupled with the at least one object storage module until the buffer log of the NVRAM is full.

23. The electronic device of claim 22, wherein the NIC is to direct a replay of the non-addressable buffer log in response to recovery from a system crash or power failure.

* * * * *